(12) United States Patent
Yamada et al.

(10) Patent No.: US 8,002,352 B2
(45) Date of Patent: Aug. 23, 2011

(54) SEAT RECLINING DEVICE

(75) Inventors: Yukifumi Yamada, Toyota (JP); Naoki Goto, Tokai (JP); Shinya Isobe, Nagoya (JP); Kazuhide Ishikawa, Anjo (JP)

(73) Assignee: Aisin Seiki Kabushiki Kaisha, Kariya-shi (JP)

( * ) Notice: Subject to any disclaimer, the term of this patent is extended or adjusted under 35 U.S.C. 154(b) by 0 days.

(21) Appl. No.: 12/922,768

(22) PCT Filed: Jul. 2, 2009

(86) PCT No.: PCT/JP2009/062093
§ 371 (c)(1),
(2), (4) Date: Sep. 15, 2010

(87) PCT Pub. No.: WO2010/007896
PCT Pub. Date: Jan. 21, 2010

(65) Prior Publication Data
US 2011/0012414 A1  Jan. 20, 2011

(30) Foreign Application Priority Data
Jul. 15, 2008  (JP) .................................. 2008-183616

(51) Int. Cl.
*B60N 2/48* (2006.01)
(52) U.S. Cl. .................. 297/366; 297/367 L; 297/367 R
(58) Field of Classification Search .............. 297/367 R, 297/367 L, 366
See application file for complete search history.

(56) References Cited

U.S. PATENT DOCUMENTS

| 4,348,050 A | 9/1982 | Letournoux et al. |
| 5,785,386 A | 7/1998 | Yoshida |
| 7,261,379 B2 * | 8/2007 | Volker et al. ............... 297/367 R |
| 7,520,568 B2 * | 4/2009 | Hoshihara et al. ......... 297/367 R |
| 2003/0178879 A1 * | 9/2003 | Uramichi ....................... 297/367 |
| 2007/0145800 A1 | 6/2007 | Thiel et al. |
| 2009/0055222 A1 * | 2/2009 | Lorsch .............................. 705/3 |
| 2009/0066137 A1 | 3/2009 | Ishihara et al. |

FOREIGN PATENT DOCUMENTS

| JP | 56 52010 | 5/1981 |
| JP | 8 19442 | 1/1996 |
| JP | 9-131237 | 5/1997 |
| JP | 2003 70583 | 3/2003 |
| JP | 2007 143806 | 6/2007 |
| JP | 2008-506481 | 3/2008 |
| WO | 2007 094444 | 8/2007 |

* cited by examiner

*Primary Examiner* — David Dunn
*Assistant Examiner* — Erika Garrett
(74) *Attorney, Agent, or Firm* — Oblon, Spivak, McClelland, Maier & Neustadt, L.L.P.

(57) ABSTRACT

In a seat reclining device, which eliminates a gap between a plurality of pawls and a guide wall, a wedge member is provided between at least one of the plurality of pawls and the guide wall, and a cam includes a wedge pressing cam portion for relatively rotating an upper arm relative to a lower arm by pressing the wedge member outwardly in a radial direction. The wedge member is for example made by a spherical or wedge shaped plate like member.

6 Claims, 6 Drawing Sheets

SEAT RECLINING DEVICE

TECHNICAL FIELD

This invention relates to a seat reclining device for a vehicle seat, supporting a seat back relative to a seat cushion so that an angle of the seat back relative to the seat cushion can be adjustable.

BACKGROUND OF THE TECHNOLOGY

Conventionally, a seat reclining device of this type disclosed in, for example, the patent document 1 has been known. The seat reclining device according to the patent document 1 includes a lower arm supported at a seat cushion side and having a pawl having an outer toothed portion at a tip end thereof and an upper arm rotatably supported by the lower arm and at the same time fixed to a seat back side, the upper arm being formed with an inner toothed portion engageable with the outer toothed portion of the pawl. The reclining angle of the seat back can be adjustable by varying the engagement position between the inner and outer toothed portions.

In the seat reclining device disclosed in the patent document 1, a lock mechanism is provided which includes a cam for locking the pawl relative to the lower arm. The cam disclosed in the patent document 1 includes two types of cams, i.e., a first cam (44) engaged with a hinge pin (31) directly connected to the operating handle and a circular shaped second cam (41) disposed between the first cam and the pawl and capable of making contact with the pawl and a guide wall of the lower arm. By the rotational locking operation of the first cam, the pawl is pressed outwardly in a radial direction through the second cam thereby to be engageable with the inner toothed portion of the upper arm. Since the second cam is disposed between the guide wall and the pawl side surface, the pawl can be pressed in a direction in which the pawl is engaged with the inner toothed portion and at the same time a gap between the guide wall and the pawl side surface can be eliminated.

THE DOCUMENT OF CONVENTIONAL TECHNOLOGY

Patent Document

Patent Document 1: JP 3592749 B2

DISCLOSURE OF THE INVENTION

Problems to be Solved by the Invention

The device disclosed in the patent document 1, a gap between the guide wall and the pawl side surface can be eliminated by the second cam. However, the rattling at the shaft portion between the upper arm and the lower arm through the hinge pin cannot be eliminated and still a difficult problem remains, in which the rattling of the seat reclining device as a whole cannot be sufficiently eliminated. Further, since the structure of the device is such that the first surface of the first cam and the first surface of the pawl are facing with each other having a small gap therebetween and that the pressing of the pawl is carried out at only approximately a central portion by the circular shaped second cam, the device has another problem that the pawl is not pressed by the pawl at the entire width in a balanced manner and that the pawl may not be locked to the upper arm in a stable manner.

The present invention was made in consideration with solving the above problems and the object of the invention is to provide a seat reclining device for a vehicle which can prevent rattling of the seat reclining device by eliminating respective gaps between the plurality of pawls and the guide walls on the circumference of circle by a wedge function.

Means for Solving the Problem

The feature of the seat reclining device associated with claim 1 of this invention made for solving the above problem is characterized in that a seat reclining device comprises a lower arm adapted to be fixed to a seat cushion side, an upper arm relatively rotatably supported by the lower arm and adapted to be fixed to a seat back side, a plurality of pawls disposed within the lower arm and movable in a radial direction guided by a guide walls, and respectively having an outer toothed portion engageable with or disengageable from an inner toothed portion provided at an inner periphery of the upper arm, a wedge member provided between at least one of the plurality of pawls and the guide wall, a cam having a cam surface to be in contact with cam portions formed on the plurality of pawls and pressing the pawls in a direction in which the pawls are to be engaged with the inner toothed portion by a rotation of the cam, and having a wedge pressing cam portion for pressing the wedge member outwardly in a radial direction thereby rotating the upper arm relative to the lower arm, and a biasing member for rotationally biasing the cam in one direction.

The structure of the seat reclining device associated with claim 2 of this invention is characterized in that in claim 1, the cam portion of the pawl on which the wedge member acts is provided with a pressing portion directly pressed outwardly in the radial direction by the cam surface of the cam at a central portion and one end of the pawl and a pressing portion pressed through the wedge member outwardly in the radial direction by the wedge pressing cam portion at the other end of the pawl.

The structure of the seat reclining device associated with claim 3 of this invention is characterized in that in claim 1 or claim 2, the wedge member is provided in a front side of a locking rotational direction of the cam relative to the pawl.

The structure of the seat reclining device associated with claim 4 of this invention is characterized in that in any one of claims 1 through 3, a gap between the contact surface for the wedge member with the pawl and the contact surface for the wedge member with the guide wall is provided to be gradually narrowed towards outward in the radial direction and a rotation center of the cam is positioned in an area formed between extended lines of the contact surfaces.

The structure of the seat reclining device associated with claim 5 of this invention is characterized in that in any one of claims 1 through 4, the wedge member is of spherical shape.

The structure of the seat reclining device associated with claim 6 of this invention is characterized in that in any one of claims 1 through 4, the wedge member is a wedge shaped plate member, the width of which is wide at one end and is gradually narrowing towards the other end.

The Effects of the Invention

In the seat reclining device according to the invention of claim 1, the wedge member is provided between at least one of the plurality of pawls and the guide wall and the cam includes the wedge pressing cam portion for relatively rotating the upper arm relative to the lower arm by pressing the wedge member outwardly in a radial direction. According to the structure, the pawl and the guide wall receive forces in the opposite directions mutually separating from each other by the wedge action when the wedge member is pressed by the wedge pressing cam portion outwardly in the radial direction. Accordingly, the lower arm provided with the guide wall and the lower arm which engages with the pawl are relatively rotated to eliminate the gaps between the plurality of pawls and the guide walls. Thus the rattling of the seat back frame relative to the seat cushion frame can be surely prevented.

In the seat reclining device according to the invention of claim 2, the cam portion of the pawl on which the wedge member acts is formed with a pressing portion at the central portion of the pawl and one end thereof directly pressed by the cam surface of the cam outwardly in the radial direction and another pressing portion at the other end of the pawl pressed through the wedge member by the wedge pressing cam portion outwardly in the radial direction. Thus, by this structure, the pawl which interferes with the wedge member is locked to the upper arm side by the three pressing portions in a stable posture. Thus, the outer toothed portion of each pawl is surely engaged with the inner toothed portion of the upper arm.

In the seat reclining device according to the invention of claim 3, the wedge member is arranged against the pawl in a front side of locking rotational direction of the cam with respect to the pawl, and accordingly, the gaps between the cam and the plurality of pawls are generated in response to the movement of the pawl in the direction away from the wedge member by the wedge operation. By thus generated gaps, the cam can be further rotated in a locking direction to avoid instable locking condition which may be derived from the provision of the wedge member.

In the seat reclining device according to the invention of claim 4, the gap between the contact surface for the wedge member with the pawl and the contact surface for the wedge member with the guide wall is provided to be gradually narrowed towards outward in the radial direction and the cam rotation center is positioned in an area formed between the extended lines of the contact surfaces. Accordingly, the wedge member is movable in the radial direction of the cam and as the cam rotates, the wedge member can be smoothly moved.

In the seat reclining device according to the invention of claim 5, since the wedge member is made by a spherical member, the gaps on the circumference of circle between the plurality of pawls and the guide walls can be eliminated by the spherical member and accordingly, the rattling of the seat back frame relative to the seat cushion frame can be prevented.

In the seat reclining device according to the invention of claim 6, the wedge member is a wedge shaped plate member, the width of which is wide at one end and is gradually narrowing towards the other end. The gaps on the circumference of circle between the plurality of pawls and the guide walls can be eliminated by the wedge shaped plate member, and accordingly, the rattling of the seat back frame relative to the seat cushion frame can be prevented.

BRIEF EXPLANATION OF ATTACHED DRAWINGS

FIG. 4 is a detail view of a first pawl and FIG. 4 (A) is a front view of the first pawl and FIG. 4(B) is a side view of the first pawl seen from the B-direction.

FIG. 5 is a detail view of a second pawl and FIG. 5 (A) is a front view of the second pawl and FIG. 5(B) is a side view of the second pawl seen from the B-direction.

THE EMBODIMENTS OF THE INVENTION

Figure 1:
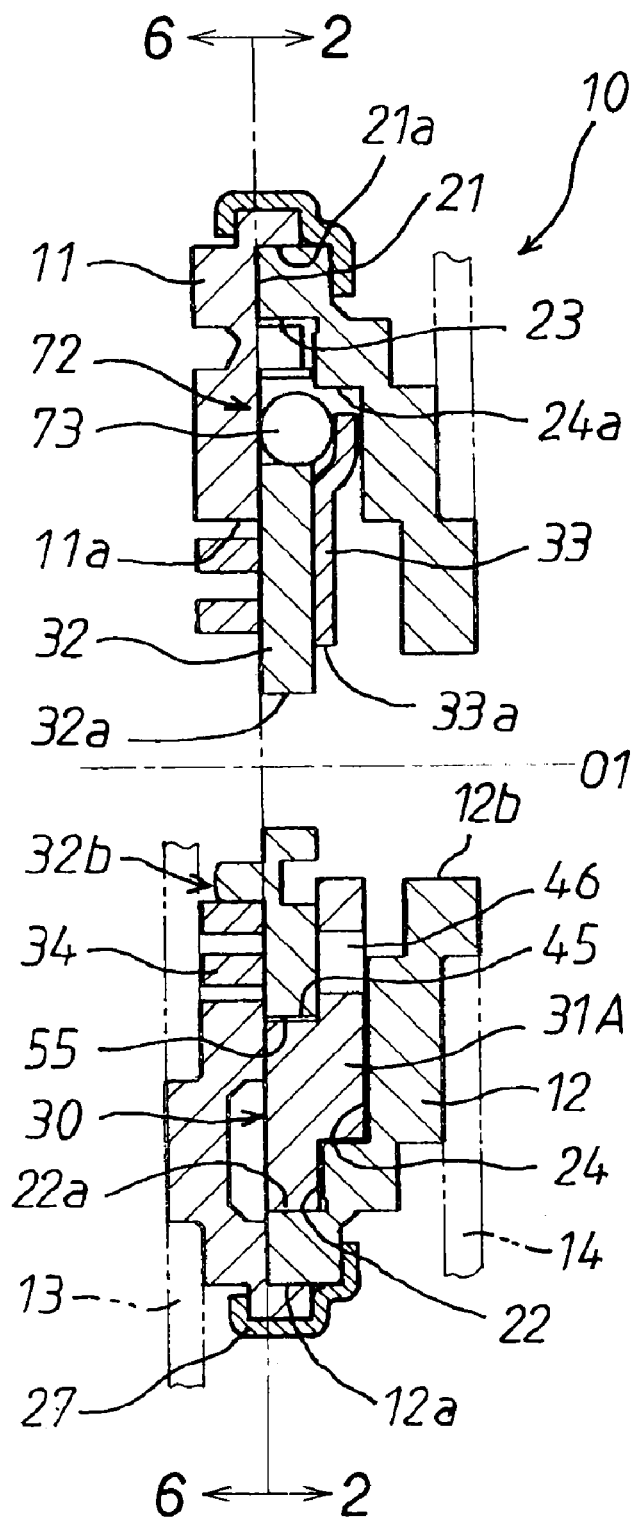
FIG. 1 is a cross sectional view of the seat reclining device according to a first embodiment of the invention.

The first embodiment of the present invention will be explained with reference to the attached drawings. The seat reclining device 10 for a vehicle includes, as shown in FIG. 1, a disc shaped lower arm 11 and a disc shaped upper arm 12. The lower arm 11 is fixed to a seat cushion frame 13 and the upper arm 12 is fixed to a seat back frame 14.

The lower arm 11 includes a circular shaped recessed portion 21 formed by half blanking and open to the upper arm 12 side and a through hole 11a at the central portion thereof. The circular shaped recessed portion 21 of the lower arm 11 includes an inner peripheral surface 21a centering on the rotational axis line 01 of the upper arm 12 and the lower arm 11. The upper arm 12 is disposed in the lower arm 11 so that an outer peripheral surface 12a of the upper arm slidably contacts with the inner peripheral surface 21a of the lower arm 11.

On the other hand, the upper arm 12 includes a circular shaped recessed portion 22 formed by half blanking and open to the lower arm 11 side and a through hole 12b at the central portion thereof. The circular shaped recessed portion 22 of the upper arm 12 includes an inner peripheral surface 22a centering on the rotational axis line 01. The inner peripheral surface 22a of the circular shaped recessed portion 22 is provided with an inner toothed portion 23 along the entire inner periphery. A circular shaped recessed portion 24 is formed concentrically with the circular shaped recessed portion 22 by half blanking. Respective projections 25 are provided on the inner peripheral surface 24a of the circular shaped recessed portion 24 at two spaced portions in a circumferential direction projecting towards the rotational axis line 01.

A ring shaped metal plate holder 27 is inserted into the respective outer peripheral portions of the lower arm 11 and the upper arm 12 under the engaged condition of the outer peripheral surface 12a of the upper arm 12 having been inserted into the inner peripheral surface 21a of the circular shaped recessed portion 21 of the lower arm 11. The holder 27 serves as a retainer preventing disassembling in an axial direction of the lower and upper arms but allowing a relative rotational movement therebetween.

Figure 2:
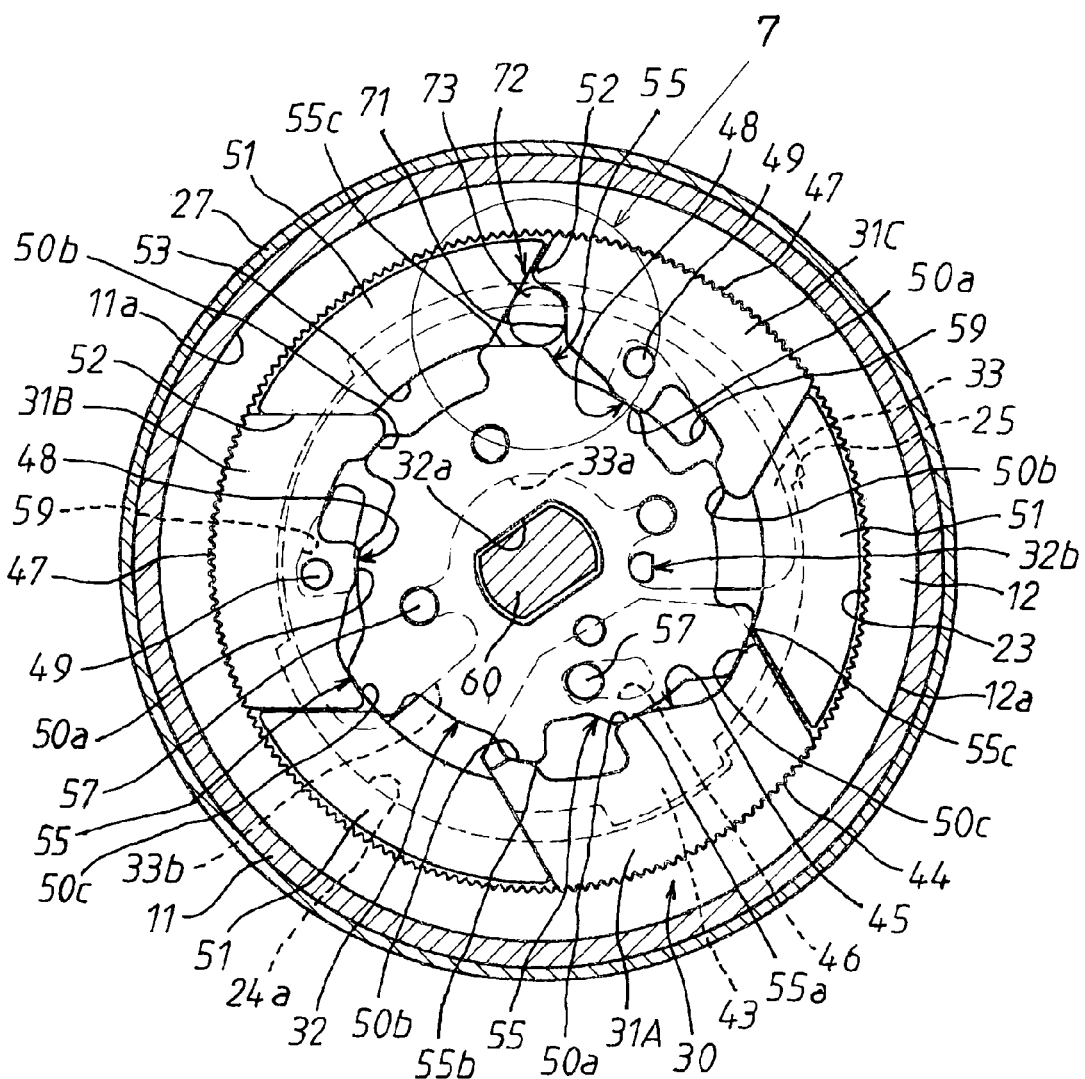
FIG. 2 is a cross sectional view taken along the line 2-2 in FIG. 1.
Figure 3:
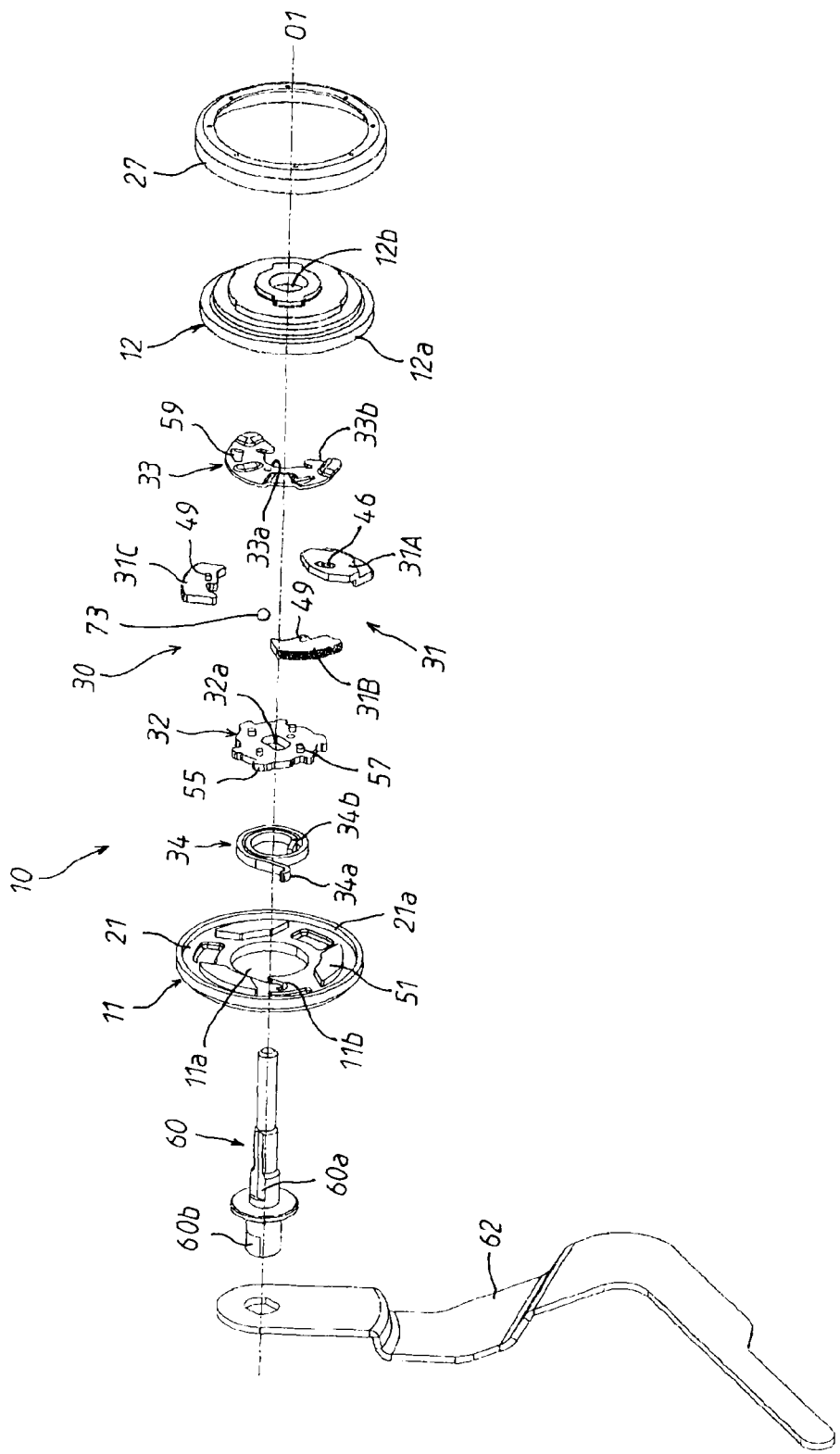
FIG. 3 is an exploded view of the seat reclining device shown in FIG. 1.

A lock mechanism 30 is provided between the lower and upper arms 11 and 12. The lock mechanism 30, as shown in FIGS. 2 and 3, is formed mainly by three pawls 31 (31A, 31B and 31C as will be explained later in detail) provided in a circumferential direction, a cam 32, a release plate 33 and a spiral spring 34, a biasing member, (See FIGS. 3 and 6). The pawls 31 are formed by three pawls of two types arranged in a plane perpendicular to the rotational axis line 01 with an equal angle distance with one another in a circumferential direction.

One of the pawls 31 (hereinafter referred to as a first pawl 31A) is formed by forging or the like a steel and as shown in detail in FIG. 4, includes a first block 41 and a second block 42 formed as a mutually stepwise shape as seen from the side view. As shown in FIG. 2, the first block 41 of the first pawl 31A is arranged at an inner peripheral surface 22a side of the upper arm 12 and the second block 42 is arranged at an axial center side of the upper arm 12. Both width end portions 31A1 of the first and the second blocks 41 and 42 agree with and are formed to be parallel lines. An outer toothed portion 44 is provided at an outer end (end surface opposing to the inner toothed portion 23 of the upper arm 12) of the first block 41 to be engageable with the inner toothed portion 23 of the upper arm 12 and an inner surface cam portion 45 is formed at an inner end (an end surface in a reverse direction of the outer end) of the first block 41 to be engageable with the outer periphery of the cam 32. Further, a pawl side groove cam portion 46 is provided at an approximately central portion in a width direction of the second block 42 and penetrating through the second block 42 in a thickness direction thereof.

On the other hand, the remaining two of the pawls 31 (hereinafter referred to as a second pawl 31B and a third pawl 31C) are formed by pressing or the like a steel plate and as shown in detail in FIG. 5, have a flat shape without having a stepped portion, which is similar to a shape formed only by the first block 41 wherein the second block 42 is cut off from the first pawl 31A. In other words, the second and third pawls 31B and 31C are shorter than the first pawl 31A in a radial direction by the length of the second block 42 and thinner in a thickness direction by the thickness of the second block 42. Similar to the first pawl 31A, both width end portions 31B1 are formed to be parallel lines. An outer toothed portion 47 is formed at the outer end of the second and third pawls 31B and 31C to be engageable with the inner toothed portion 23 of the upper arm 12. An inner surface cam portion 48 is provided at the second and third pawls 31B and 31C to be engageable with the outer periphery of the cam 32. Further, an engaging projection 49 is provided at the central portion in a width direction at the second and third pawls 31B and 31C.

The shape of the inner surface cam portion 45 formed at the stepped portion of the first pawl 31A is formed to be the same shape of the inner surface cam portion 48 formed at the inner end of the second pawl 31B. In other words, as shown in FIGS. 4(A) and 5(B), the inner surface portions 45 and 48 are provided with three pressing portions 50a, 50b and 50c, upon which the cam surface 55 of the cam 32 acts, at the central portion in the circumferential direction and at both sides in circumferential direction of the first pawl 31A and the second pawl 31B, respectively. The pressing portion 50a provided at the central portion of the first pawl 31A and the second pawl 31B and the pressing portion 50b provided at a back side of the cam 32 in a locking rotational direction have an inclined surface which approaches towards the cam surface 55 of the cam 32 in response to the rotation in a locking rotational direction (clockwise direction as viewed in FIG. 2) of the cam 32. The pressing portion 50c provided at a front side of the cam 32 in a locking rotational direction has a circular surface centering on the rotation center of the cam 32.

The shape of the third pawl 31C is approximately the same with the shape of the second pawl 31B, but instead of having the pressing portion 50c of the second pawl 31B, a wedge operating portion 72 which will be later explained is provided. This is the only difference between the second and third pawls 31B and 31C in shape.

Figure 4:
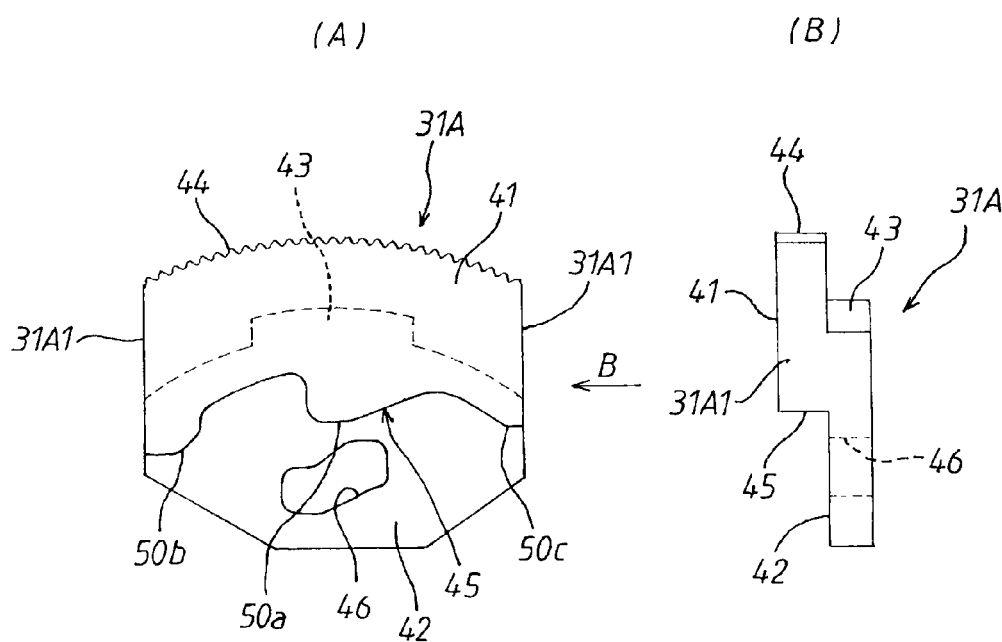
Figure 5:
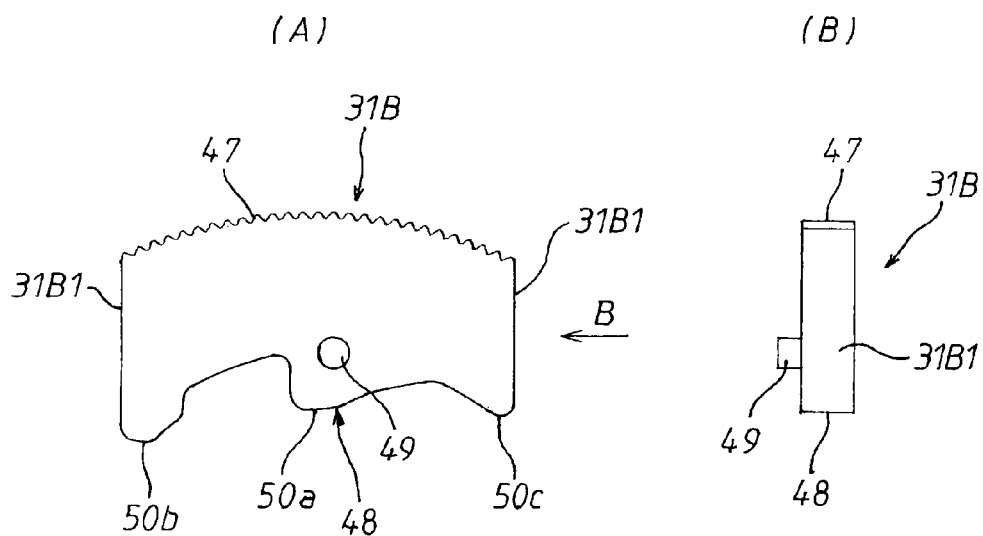

Three guide walls 51 are arranged in the circular shaped recessed portion 21 of the lower arm 11 with an equal angle distance from one another in a circumferential direction and a pair of oppositely provided parallel guide surfaces 52 are provided between the adjacently positioned two guide walls 51 for slidably guiding both width portions 31A1 and 31B1 (see FIGS. 4 and 5). Thus the first, second and third pawls 31A, 31B and 31C are slidably guided by the guide surfaces 52 of the guide walls 51 in a radial direction of the lower arm 11 and the upper arm 12 to have each outer toothed portion 44 and 47 engage with or disengage from the inner toothed portion 23. The circular surface 53 is provided at the inner periphery of the guide walls 51 centering on the rotational axis line 01.

An inclined surface 71 is formed in the third pawl 31C at one side surface of front side of a rotational direction of the cam 32 opposite to the guide surface 52 of the guide wall 51. The inclined surface 71 has a width continuously narrowing towards outside in a radial direction to be of a straight line shape. In other words, the distance between the guide surface 52 of the guide wall 51 and the inclined surface is gradually variable towards outside in a radial direction and a centerline between the guide surface 52 and the inclined surface 71 forms the wedge operating portion 72 towards the rotational axis line 01 of the cam 32. A wedge member 73 formed by a spherical member which is to be in contact with the guide surface 52 and the inclined surface 71 is provided at this wedge operating portion 72. The wedge member 73 is supported between the end surface of the circular recessed portion 21 of the lower arm 11 and a circumferential portion of a release plate 33 in an axial direction of the cam 32 and is movable in a radial direction by contacting with the guide surface 52 and the inclined surface 71. The wedge member 73 is pressed by the cam surface 55 of the cam 32, which will be explained later, outwardly in a radial direction and by the wedge operating portion 72, the third pawl 31C engaged with the upper arm 12 is moved relative to the guide wall 51 provided at the lower arm 11 in a direction mutually away from each other.

The cam 32 of the lock mechanism 30 is rotatably provided on the rotational axis line 01 within the circular recessed portion 22 of the upper arm 12 and includes a through hole 32a at the central portion. Further, the cam 32 includes three sets of cam surfaces 55 each separated from one another with an equal angle distance in a circumferential direction at the outer peripheral brim. One set of cam surfaces 55 is arranged to be engageable with each pressing portion 50a, 50b and 50c of the inner surface cam portion 45 of the first pawl 31A. One set of the remaining two sets of cam surfaces 55 is arranged to be engageable with each pressing portion 50a, 50b and 50c of the inner surface cam portion 48 of the second pawl 31B and the other one set of the remaining two sets is arranged to be engageable with each pressing portion 50a, 50b of the inner surface cam portion 48 of the third pawl 31C and the wedge member 73. The cam surface 55 may press upon a portion close to the engagement portion between the outer toothed portions 44 and 47 of the first, second and third pawls 31A, 31B and 31C and the inner toothed portion 23. Thus, the upper arm 12 can be securely locked to the lower arm 11 with a strong fixing force.

Each cam surface 55 includes three pressing cam portions 55a, 55b and 55c which are engageable with the pressing portions 50a, 50b and 50c of the first, second and third pawls 31A, 31B and 31C, respectively. The pressing cam portion 55c to be engageable with the wedge member 73 functions as a wedge pressing cam portion. When the cam 32 is rotated to reach a locking position, the three pressing cam portions 55a, 55b and 55c are maintained to respective angle positions to be in contact with the pressing portions 50a, 50b and 50c of the inner surface cam portions 45 and 48 of the first and the second pawls 31A and 31B and the pressing portions 50a and 50b of the inner surface cam portion 48 of the third pawl 31C and the wedge member 73. When the cam 32 is rotated to an unlocking position, the pressing cam portions 55a, 55b and 55c are separated from the pressing portions 50a, 50b and 50c and the wedge member 73 and at the same time the pressing cam portion (wedge pressing cam portion) 55c is maintained to an angle position to be engaged with the circular surface 53 of the guide wall 51.

A plurality of engaging projections 57 are provided with an equal angle distance separated from one another in a circumferential direction at the side surface of the cam 32. One of the engaging projections 57 is engaged with a pawl side groove cam portion 46 formed at the first pawl 31A. The engagement between the engaging projection 57 and the pawl side groove cam portion 46 functions to move the first pawl 31A inwardly in a radial direction by the rotation of the cam 32 in an unlocking direction.

A thin plate shaped release plate 33 is integrally attached by being engaged with the engaging projection 57 at the side surface of the cam 32. The release plate 33 includes a through hole 33a at the central portion thereof. The release plate 33 is attached to the cam 32 to agree with the second block 42 of the first pawl 31A in an axial line direction and is positioned facing the end surface of the second pawl 31B to be slidably movable thereon. Thus, the second and the third pawls 31B and 31C and the release plate 33 are housed within the thickness range of the first pawl 31A. The release plate 33 is formed by an approximately annular shaped plate to be in non-contact condition with the projection 25 formed at the upper arm 12. A sector recess 33b is formed at a portion of the annular shaped plate for disposing therein the first pawl 31A. In other words, the portion of the annular shaped plate is cut to form the sector shaped recess 33b with an angle range corresponding to the shape of first pawl 31A so that the release plate 33 may not interfere with the first pawl 31A upon rotation of the cam 32.

Two release plate side groove cam portions 59 are formed on the circumference of the release plate 33 centering on the rotation center and are penetrating through the release plate in a thickness direction. The release plate side groove cam portions 59 are arranged further outwardly in a radial direction than the circumferential position of the engaging projection 57 to oppose to the end surfaces of the second and third pawls 31B and 31C, respectively. Thus, the engaging projections 49 provided at the second and third pawls 31B and 31C are engaged with the release plate side groove cam portions 59, respectively. By this engagement between the engaging projections 49 and the release plate side groove cam portions 59, the second and third pawls 31B and 31C are moved inwardly in a radial direction when the release plate 33 is rotated in an unlocking direction together with the cam 32.

A hinge shaft 60 is provided on the rotational axis line 01 as shown in FIG. 3 and rotatably penetrates through the through holes 11a, 32a, 33a and 12b provided at the rotation centers of the lower arm 11, the cam 32, the release plate 33 and the upper arm 12, respectively. An engaging portion 60a having two flat surfaces is formed on the hinge shaft 60 at an approximately central portion in an axial direction. The through hole 32a of the cam 32 in which the hinge shaft 60 is inserted has an engaged portion having two flat surfaces to be engaged with the engaging portion 60a of the hinge shaft 60 for unitary rotation of the hinge shaft 60 and the cam 32. The through hole 32a of the cam 32, as shown in FIG. 2, is formed to be slightly larger than the engaging portion 60a of the hinge shaft 60 so that a gap in a radial direction is provided between the cam 32 and the hinge shaft 60. Accordingly, the cam 32 can be movable in a radial direction relative to the hinge shaft 60 within the circular shaped recessed portion 22 of the upper arm 12. Further, an engaging portion 60b having two flat surfaces is provided at one end of the hinge shaft 60 and an operating handle 62 is integrally attached to the hinge shaft 60 by the engagement of the engaging portion 60b of the hinge shaft 60 with an engaged bore having two flat surfaces formed on the handle 62.

Figure 6:
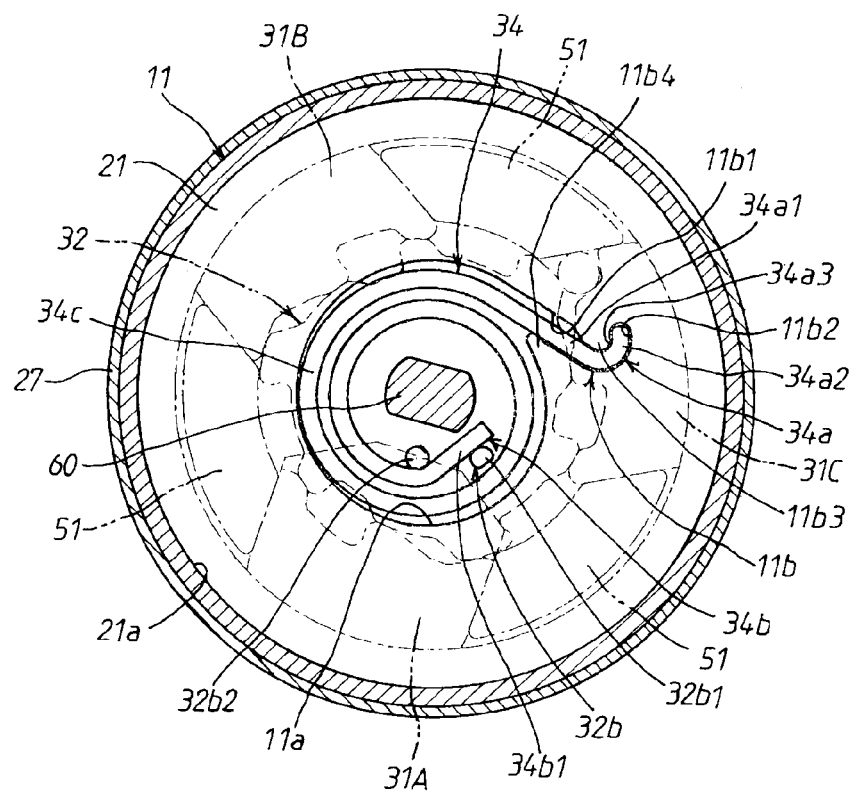
FIG. 6 is a cross sectional view taken along the line 6-6 in FIG. 1.
Figure 7:
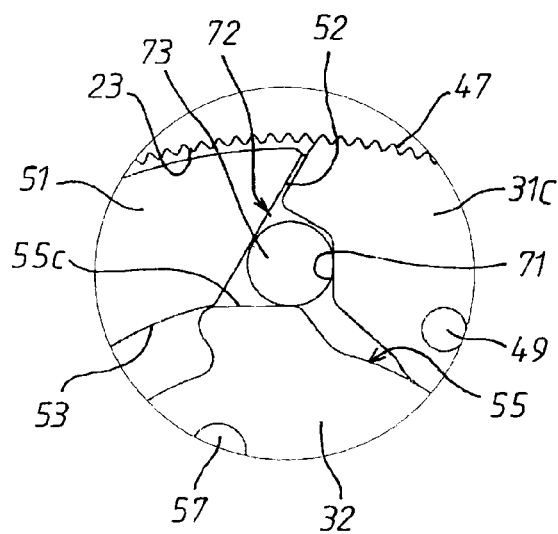
FIG. 7 is an enlarged view of an area indicated by numeral 7 in FIG. 6.

The spiral spring 34 rotatably biases the cam 32 in a direction in which the pawl 31 engages with the upper arm 12 and is disposed in the accommodating portion 11a of the lower arm 11. The spiral spring 34 is formed by bending and winding a flat wire rod of rectangular shape to a predetermined spiral shape as shown in FIG. 3 and FIG. 6 and is provided between the lower arm 11 and the cam 32. The spiral spring 34 is formed by an outer end portion 34a, an inner end portion 34b and a wound portion 34c formed by winding and provided between the outer and inner end portions 34a and 34b. The outer end portion 34a of the spiral spring 34 is engaged with the engaging portion 11b formed at the lower arm 11 and the inner end portion 34b is engaged with the engaging portion 32b provided at the end surface of the cam 32.

In other words, the outer end portion 34a of the spiral spring 34 includes a straight line portion 34a1 extending in a tangential direction, a bending portion 34a2 formed at further outward than the straight line portion 34a1 and bent toward outside and a circular shaped recessed portion 34a3 formed at a connecting portion between the straight line portion 34a1 and the bending portion 34a2. The inner end portion 34b of the spiral spring 34 includes a straight line shaped bent portion 34b1 slightly bent towards the central direction of the spiral spring 34.

On the other hand, the engaging portion 11b of the lower arm 11 to be engaged with the outer end portion 34a of the spiral spring 34 includes a guide recessed portion 11b1 extending in a tangential direction of the through hole 11a of the lower arm 11 and a bent recessed portion 11b2 bent from a tip end of the guide recessed portion 11b1. The straight line portion 34a1 of the outer end portion 34a of the spiral spring 34 is inserted into the guide recessed portion 11b1 and the bending portion 34a2 of the outer end portion 34a is inserted into the bent recessed portion 11b2. The guide recessed portion 11b1 is provided with a first projecting portion 11b3 to be in contact with the circular shaped recessed portion 34a3 formed at the connecting portion of the straight line portion 34a1 and the bending portion 34a2 of the spiral spring 34 and a second projecting portion 11b4 positioned opposite to the first projecting portion 11b3 with respect to the wire rod of the spiral spring 34 and being in contact with the straight line portion 34a1 of the outer end portion at the position separated from the first projecting portion 11b3 with a predetermined distance.

In other words, by inserting the bending portion 34a2 of the outer end portion 34a of the spiral spring 34 into the bent recessed portion 11b2 of the engaging portion 11b of the lower arm 11, the movement of the outer end portion 34a along the straight line portion 34a1 is prevented. Further, by making the inner peripheral side surface of the straight line portion 34a1 of the outer end portion 34a (inner peripheral side surface of the wound portion 34c) to be in contact with the second projecting portion 11b4 and at the same time by making the outer peripheral side surface of the straight line portion 34a1 (outer peripheral side surface of the wound portion 34c) to be in contact with the first projecting portion 11b3 at a portion further outer side than the contact portion with the inner peripheral side surface, the biasing force of the spiral spring 34 having a fulcrum point at the bending portion 34*a*2 is properly received in the lower arm and the axial center of the spiral spring 34 can be kept on the rotational axis line 01.

The engaging portion 32*b* of the cam 32 for engaging with the inner end portion 34*b* of the spiral spring 34 includes two projecting portions 32*b*1 and 32*b*2 and the first projecting portion 32*b*1 is arranged to be engaged with the inner side of the connecting portion of the bent portion 34*b*1 of the inner end portion 34*b* and the wound portion 34*c* of the spiral spring 34 and the second projecting portion 32*b*2 is positioned opposite to the first projecting portion 32*b*1 with respect to the wire rod of the spiral spring 34 and is in contact with the tip end portion of the bent portion 34*b*1 at the position separated from the first projecting portion 32*b*1 with a predetermined distance.

The cam 32 receives a biasing force in a clockwise direction as viewed in FIG. 2 by engaging the outer end portion 34*a* of the spiral spring 34 with the engaging portion 11*b* of the lower arm 11 and at the same time by engaging the inner end portion 34*b* with the engaging portion 32*b* of the cam 32 under the situation wherein thus structured spiral spring 34 accumulates an spring force. In this case, the bending portion 34*a*2 of the outer end portion 34*a* of the spiral spring 34 is engaged with the bent recessed portion 11*b*2 of the engaging portion 11*b* of the lower arm 11 and both sides of the straight line portion 34*a*1 of the outer end portion 34*a* is engaged with the first and the second projecting portions 11*b*3 and 11*b*4 at positions separated with a predetermined distance. Thus, due to the spring force of the spiral spring 34, the spiral spring 34 generates a biasing force in a clockwise direction as viewed in FIG. 6 with the fulcrum point at the bending portion 34*a*2. Both sides of the straight line portion 34*a*1 are made in contact with the first and the second projecting portions 11*b*3 and 11*b*4 by the biasing force to securely keep the axial center of the spiral spring 34 to be fixed on the rotational axis line 01. As the result, the axial center position of the spiral spring 34 can continue to be in almost the same position as the original position even when the biasing force (elastic reaction force) changes due to the winding up of the spiral spring 34. This can prevent the outer periphery of the spiral spring 34 from making contact with the inner periphery of the through hole 11*a* of the lower arm 11 or can prevent mutual contact between the adjacently positioned wire rods of the spiral spring 34. As the result, the spring force of the spiral spring 34 would not be reduced by friction resistance or the like.

By the biasing force of thus structured spiral spring 34, the cam 32 is rotated in a locking rotational direction (clockwise direction as viewed in FIG. 2) relative to the lower arm 11. The cam surface 55 presses the first, second and third pawls 31A, 31B and 31C outwardly in a radial direction to engage the outer toothed portions 44 and 47 of the first, second and third pawls 31A, 31B and 31C with the inner toothed portion 23 of the upper arm 12.

Next, the operation of thus structured seat reclining device 10 will be explained.

FIG. 2 shows the locking condition of the seat reclining device 10. Under this condition, the pressing cam portions 55*a* and 55*b* of the cam 32 engage with the inner cam surface portions 45 and 48 of the first, second and third pawls 31A, 31B and 31C, respectively to push the first, second and third pawls 31A, 31B and 31C outwardly in a radial direction. Then, the outer toothed portions 44 and 47 of the first, second and third pawls 31A, 31B and 31C engage with the inner toothed portion 23 of the upper arm 12 to restrict the rotation of the upper arm 12 relative to the lower arm 11. In this case, since the cam 32 is movable in a radial direction relative to the hinge shaft 60 within the circular shaped recessed portion 21, the cam 32 can press the three pawls 31 (31A, 31B and 31C) with approximately equal pressing force. Accordingly, the upper arm 12, and consequently, the seat back frame 14 can be surely locked without generating rattling.

In this case, the bending portion 34*a*2 of the outer end portion 34*a* of the spiral spring 34 is engaged with the bent recessed portion 11*b*2 of the engaging portion 11*b* of the lower arm 11 and accordingly, the movement of the spiral spring 34 along the straight line portion 34*a*1 can be restricted and since the both sides of the straight line portion 34*a*1 of the outer end portion 34*a* are engaged with the first and the second projecting portions 11*b*3 and 11*b*4 at the positions separated with the predetermined distance, the both sides of the straight line portion 34*a*1 are made in contact with the first and the second projecting portions 11*b*3 and 11*b*4 by the spring force of the spiral spring 34 to fixedly keep the spiral spring 34 on to the rotational axis line 01. As the result, the spiral spring 34 is kept to the original spiral shape and this can prevent the outer periphery of the spiral spring 34 from making contact with the lower arm 11 or can prevent mutual contact between the adjacently positioned wire rods of the spiral spring 34. As the result, the spring force of the spiral spring 34 would not be reduced by friction resistance or the like.

Further, the wedge member 73 provided at the wedge operating portion 72 formed between the third pawl 31C and the guide wall 51 is pressed outwardly in a radial direction by the pressing cam portion 55*b* of the cam 32. By this wedge operation, the third pawl 31C and the guide surface 52 of the guide wall 51 receive the force in a direction in which both are mutually separated. Thus the lower arm 11 provided with the guide wall 51 and the upper arm 12 engaged with the pawl 31 are relatively rotated and respective gaps on the circumference between the first, second and second pawls 31A, 31B and 31C and the guide walls 51 can be eliminated to prevent the rattling of the seat back (seat back frame 14) with respect to the seat cushion (seat cushion frame 13).

Further, the wedge operating portion 72 is arranged in front side of locking rotational direction and accordingly, the wedge operation generates gaps between the cam 32 and the pawls 31 in response to the movement of the third pawl 31C in a direction away from the wedge operating portion 72. By thus generated gaps, the cam 32 can be further rotated in a locking direction to avoid instable locking condition which may be derived from the provision of the wedge operating portion 72.

Under this condition, when the hinge shaft 60 is rotated in a counterclockwise direction as viewed in FIG. 2 by operating the operating handle 62, the cam 32 and the release plate 33 are unitarily rotated against the biasing force of the spiral spring 34. By this, the engagement of the inner surface cam portions 45 and 48 of the first, second and second pawls 31A, 31B and 31C with the pressing cam portions 55*a* and 55*b* of the cam surface 55 are released and the centering adjustable portions 55*c* are moved in a direction not to interfere with the inner surface cam portions 45 and 48 and at the same time the engagement of the pawl side groove cam portion 46 of the first pawl 31A with the engaging projection 57 of the cam 32 pulls the first pawl 31A towards the rotational axis line 01 side along the guide surface 52 of the guide wall 51 to release the engagement between the outer toothed portion 44 of the first pawl 31A and the inner toothed portion 23. Further at the same time, the engagement of the release plate side groove cam portion 59 with the engaging projections 49 of the second and the third pawls 31B and 31C pulls the second and the third pawls 31B and 31C towards the rotational axis line 01 side along the guide surface 52 of the guide wall 51 to release the engagement between the outer toothed portion 47 of the second and the third pawls 31B and 31C and the inner toothed portion 23.

Accordingly, the seat back supported by the seat back frame 14 can be rotated to any angular position relative to the seat cushion supported by the seat cushion frame 13. Since the three sets of pressing cam portions 55c of the cam 32 are engaged with the inner peripheral surfaces 53 of the guide walls 51, respectively, the center of the cam 32 is adjusted by the inner peripheral surfaces 53 of the guide walls 51. As the result, the gaps between the outer toothed portions 44 and 47 of the first, second and second pawls 31A, 31B and 31C and the inner toothed portion 23 are adjusted to be approximately equal to one another to prevent a faulty rotational movement and any possible generation of abnormal noise caused by the interference the tip end of one pawl 31 with the tip end of the inner toothed portion 23.

Further, under the condition that the lock has been released, if the seat back (seat back frame 14) is rotated further forwardly than a predetermined angular position relative to the seat cushion (seat cushion frame 13), in other words, rotated into a so-called front tilted angle range, the projection 25 formed on the inner periphery of the circular shaped recessed portion 24 of the upper arm 12 positions between the engaging portion 43 of the first pawl 31A and the inner toothed portion 23. In other words, the first pawl 31A is prevented from the outward movement in a radial direction by the engagement of the engaging portion 43 thereof with the projection 25 of the upper arm 12. Under this condition, when the operating handle 62 is released, the cam 32 presses the first pawl 31A in a direction to be engaged with the inner toothed portion 23 by the functional force of the spiral spring 34. However, the movement of the first pawl 31A is prevented by the engagement of the projection 25 of the upper arm 12 with the engaging portion 43 of the first pawl 31A and accordingly, the first pawl 31A cannot come into an engagement with the inner toothed portion 23. At the same time the movement of the first pawl 31A in a radial direction is prevented and consequently, the rotation of the cam 32 is prevented. Thus the release plate 33 is not rotated and the second and the third pawls 31B and 31C are kept to a non-engaging position separated from the inner toothed portion 23 by the release plate side groove cam portion 59. Thus, the seat back can be freely rotatable without being locked in the front tilted angle range.

The operating lever 62 is operated to return the seat backward so that the seat is returned to the optimum position to be seated from the front tilted angle position, and then the operator releases the hand from the operating handle 62, the first, second and second pawls 31A, 31B and 31C, the cam 32 and the release plate 33 are returned to the respective positions shown in FIG. 2 and the seat becomes locked condition.

Figure 8:
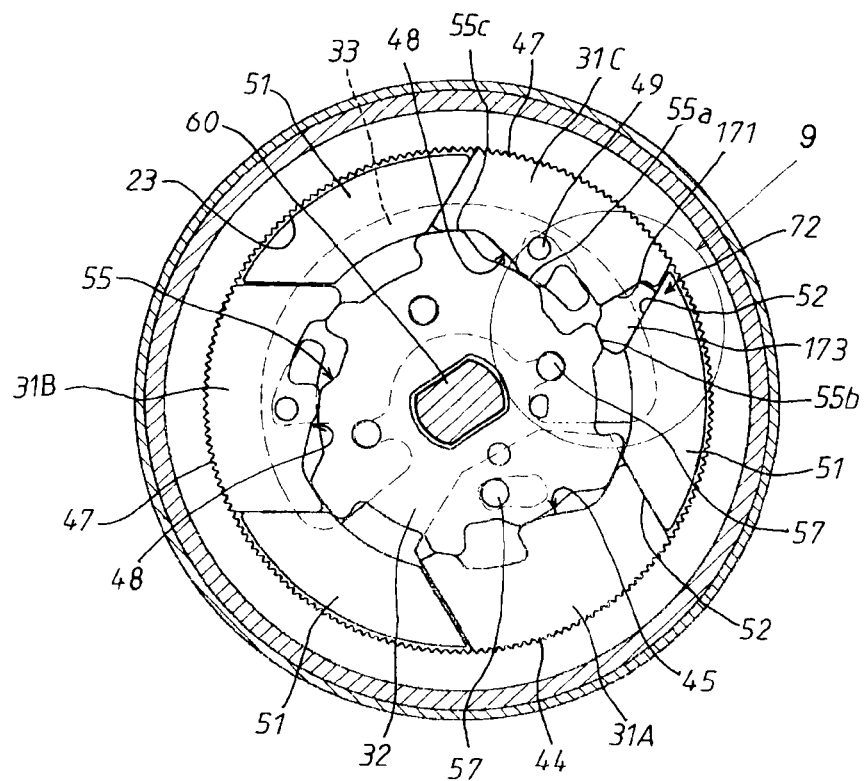
FIG. 8 is a cross sectional view of the seat reclining device according to a second embodiment of the invention.
Figure 9:
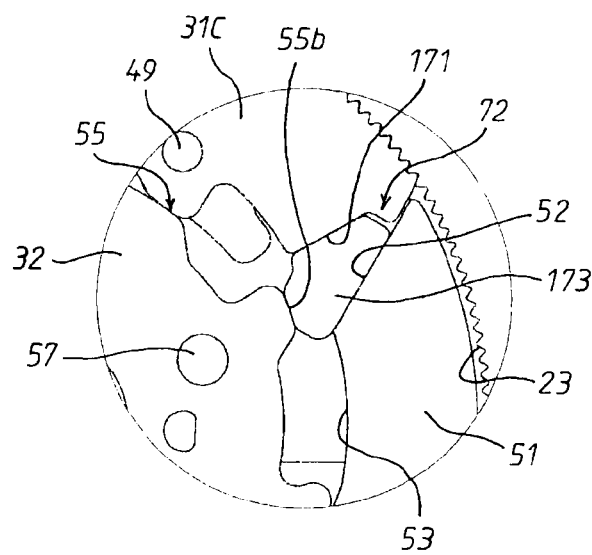
FIG. 9 is an enlarged view of an area indicated by numeral 9 in FIG. 8.

FIGS. 8 and 9 indicate the second embodiment of the invention. The different points from the first embodiment are the followings: the first point is: Instead of using the spherical member for the wedge member 73, a plate shaped wedge member 173 is used, and the second point is: the wedge operating portion 72 is arranged at inward or backward of the locking rotational direction of the cam 32 relative to the pawls 31. Accordingly, the different points from the first embodiment will be explained mainly and the same structural portions will be given the same reference numerals and the explanation thereof will be omitted.

In FIGS. 8 and 9, the third pawl 31C is provided with an inclined surface 171 at one side surface in backside of the rotational direction of the cam 32, facing the guide surface 52 of the guide wall 51. The inclined surface 171 is of straight line shape and a width between the inclined surface 171 and the guide wall 51 is consecutively narrowing towards outside in a radial direction. In other words, the gap between the guide surface 52 of the guide wall 51 and the inclined surface 171 is gradually narrowing towards outside in a radial direction and the center line between the guide surface 52 and the inclined surface 71 constitutes the wedge operating portion 72 towards the rotational axis line 01 of the cam 32. A plate shaped wedge member 173 which engages with the guide surface 52 and the inclined surface 71 is provided in the wedge operating portion 72. The wedge member 173 is made by a plate material with a predetermined thickness by forming one end thereof to have a wide width and the width is gradually narrowing towards the other end to form a wedge shape. The inclined surface 171 of the third pawl 31C and the guide surface 52 of the guide wall 51 make a surface contact therebetween.

As explained in the first embodiment, the cam 32 includes three pressing cam portions 55a, 55b and 55c which are engageable with the pressing portions 50a, 50b and 50c of the inner surface cam portions 45 and 48 of the first and the second pawls 31A and 31B, respectively at three portions on the circumference of circle and pressing portions 55a, 55b and 55c which are engageable with the pressing portions 50a and 50c of the inner surface cam portion 48 of the third pawl 31C and the wedge member 173, and the pressing cam portion 55b forms the wedge pressing cam portion.

By the structure above, when the cam 32 is rotated in a locking rotational direction, it is maintained to angular positions to be in contact with the respective pressing portions 50a, 50c and 50b of the first and the second pawls 31A and 31B and respective pressing portions 50a and 50c of the third pawl 31C and the wedge member 173. When the cam 32 is rotated to an unlocking direction, the pressing cam portions 55a, 55b and 55c are separated from the pressing portions 50a, 50b and 50c and the wedge member 173 and at the same time the pressing cam portion 55c is maintained to an angle position to be engaged with the circular surface 53 of the guide wall 51.

According to the first and the second embodiments of the invention, the wedge member 73 or 173 is provided between at least one of the plurality of pawls 31 and the guide wall 51 and the cam surface 55 of the cam 32 is provided with the wedge pressing cam portion (55c or 55b) for relatively rotating the upper arm 12 relative to the lower arm 11 by pressing the wedge member 73 or 173 outwardly in a radial direction. By this structure, the pawls 31 and the guide wall 51 receive forces in the opposite directions mutually separating from each other by the wedge action by pressing the wedge member 73 or 173 outwardly in a radial direction by the wedge pressing cam portion (55c or 55b). Accordingly, the lower arm 11 having the guide wall 51 and the upper arm 12 engaged with the pawls 31 are relatively rotated to eliminate respective gaps between the plurality of pawls 31 and the guide walls 51 on the circumference of circle. This can surely prevent rattling of the seat back frame 14 relative to the seat cushion frame 13.

According to the first and the second embodiments of the invention, the inner surface cam portion 48 of the third pawl 31C which interfere with the wedge member 73 or 173 is provided with the pressing portions 50a and 50b to be directly pressed outwardly in a radial direction by the cam surface 55 of the cam 32 at the central portion and one end of the third pawl 31C and further is provided with the pressing portion 50c or 50b to be pressed through the wedge member 73 or 173 outwardly in a radial direction by the wedge pressing cam portion 55c or 55b at the other end of the third pawl 31C. By this structure, the third pawl 31C which interferes with the wedge member 73 or 173 is locked to the upper arm 12 side by the three portions at pressing portions 50a, 50b and 50c in a stable posture. Thus, the outer toothed portion 44 or 47 of each pawl 31 can be surely engaged with the inner toothed portion 23 of the upper arm 12.

According to the first embodiment of the invention, the wedge member 72 is arranged at the front side of the locking rotational direction of the cam 32 relative to the pawls 31 and therefore, as the pawl 31 is moved in a separating direction from the wedge member 72 by the wedge action, the gaps between the cam 32 and the pawls 31 are generated to rotate the cam 32 further in a locking direction to avoid any instable locking condition which may be derived from the provision of the wedge member 72.

According to the first and the second embodiments of the invention, each gap between the guide surface 52 of the guide wall 51 to be in contact with the wedge member 73 or 173 and the inclined surface 71 of the third pawl 31C is formed to be gradually narrowed towards outside in a radial direction and at the same time the center line between the contact surfaces 52 and 71 is set to face to the rotation center of the cam 32 and accordingly, the wedge member 73 or 173 is movable in a radial direction of the cam 32. Thus the wedge member 73 or 173 is smoothly movable in accordance with the rotational movement of the cam 32.

According to the first and the second embodiments of the invention, as explained above, the center line between the guide surface 52 of the guide wall 51 to be in contact with the wedge member 73 or 173 and the inclined surface 71 of the third pawl 31C is set to face the rotation center of the cam 32, however, the rotation center of the cam 32 may be positioned in an area formed between the extended lines of the contact surfaces 52 and 71.

Further, according to the first and the second embodiments of the invention, the plurality of pawls 31 are formed with two types, first pawl 31A type and second and third pawl 31B and 31C type. However, all the pawls can be formed by one single type, first pawl 31A type and the wedge member is to be arranged against one of the first pawls 31A. Then, consequently, the release plate 33 can be eliminated. The number of pawl 31 is not limited to three (3) and four (4) or more pawls may be provided on the circumference of the circle.

The invention have been explained in accordance with the above embodiments, however, the invention is not limited to the structure explained by the embodiments and various changes or modifications can be made within the scope of the appended claims.

INDUSTRIAL APPLICABILITY

The seat reclining device according to the invention can be adapted to a vehicle seat wherein a seat back is angularly adjustably supported to a seat cushion.

EXPLANATION OF REFERENCE NUMERALS

10: seat reclining device, 11: lower arm, 12: upper arm, 13: seat cushion frame, 14: seat back frame, 23: inner toothed portion, 30: lock mechanism, 31 (31A, 31B and 31C): pawl, 32: cam, 33: release plate, 34: spiral spring, 44, 47: outer toothed portion, 45, 48: inner surface cam portion, 50a, 50b and 50c: pressing portion, 51: guide wall, 55: cam surface, 55a, 55b, 55c: pressing cam portion, 60: hinge shaft, 73, 173: wedge member, 55c (55b): wedge pressing cam portion.

The invention claimed is:

1. A seat reclining device comprising:
   a lower arm adapted to be fixed to a seat cushion side;
   an upper arm relatively rotatably supported by the lower arm and adapted to be fixed to a seat back side;
   a plurality of pawls disposed within the lower arm and movable in a radial direction guided by guide walls, and respectively having an outer toothed portion engageable with or disengageable from an inner toothed portion provided at an inner periphery of the upper arm;
   a wedge member provided between at least one of the plurality of pawls and the guide wall;
   a cam having a cam surface to be in contact with cam portions formed on the plurality of pawls and pressing the pawls in a direction in which the pawls are to be engaged with the inner toothed portion by a rotation of the cam, and having a wedge pressing cam portion for pressing the wedge member outwardly in a radial direction thereby rotating the upper arm relative to the lower arm; and
   a biasing member for rotationally biasing the cam in one direction.

2. The seat reclining device according to claim 1, wherein the cam portion of the pawl on which the wedge member acts is provided with a pressing portion directly pressed outwardly in the radial direction by the cam surface of the cam at a central portion and one end of the pawl and a pressing portion pressed through the wedge member outwardly in the radial direction by the wedge pressing cam portion at the other end of the pawl.

3. The seat reclining device according to claim 1, wherein the wedge member is provided in a front side of a locking rotational direction of the cam relative to the pawl.

4. The seat reclining device according to claim 1, wherein a gap between the contact surface for the wedge member with the pawl and the contact surface for the wedge member with the guide wall is provided to be gradually narrowed towards outward in the radial direction and a rotation center of the cam is positioned in an area formed between extended lines of the contact surfaces.

5. The seat reclining device according to claim 1, wherein the wedge member is of spherical shape.

6. The seat reclining device according to claim 1, wherein the wedge member is a wedge shaped plate member, the width of which is wide at one end and is gradually narrowing towards the other end.

* * * * *